United States Patent
Liao (10) Patent No.: US 11,743,625 B2
(45) Date of Patent: Aug. 29, 2023

(54) PORTABLE ELECTRONIC ASSEMBLY AND AN ADHERABLE EARPHONE STRUCTURE THEREOF

(71) Applicant: ASTI GLOBAL INC., TAIWAN, Taichung (TW)

(72) Inventor: Chien-Shou Liao, New Taipei (TW)

(73) Assignee: ASTI GLOBAL INC., TAIWAN, Taichung (TW)

( * ) Notice: Subject to any disclaimer, the term of this patent is extended or adjusted under 35 U.S.C. 154(b) by 142 days.

(21) Appl. No.: 17/385,919

(22) Filed: Jul. 27, 2021

(65) Prior Publication Data

US 2022/0038804 A1 Feb. 3, 2022

(30) Foreign Application Priority Data

Jul. 28, 2020 (TW) .................................. 109125354

(51) Int. Cl.
*H04R 1/10* (2006.01)
*G02C 11/00* (2006.01)
*H04R 1/08* (2006.01)
*G02C 7/04* (2006.01)

(52) U.S. Cl.
CPC ........... *H04R 1/1008* (2013.01); *G02C 11/10* (2013.01); *H04R 1/083* (2013.01); *H04R 1/1091* (2013.01); *G02C 7/04* (2013.01); *H04R 2201/10* (2013.01)

(58) Field of Classification Search
CPC .... H04R 1/1016; H04R 2460/13; H04R 1/10; H04R 1/1008; H04R 1/083; H04R 17/00; H04R 1/1041; H04R 5/0335; G02C 11/10
See application file for complete search history.

(56) References Cited

U.S. PATENT DOCUMENTS

| | | | |
|---|---|---|---|
| 10,512,750 B1* | 12/2019 | Lewin Jessen | ...... H04R 1/1041 |
| 2019/0025609 A1* | 1/2019 | Liao | .......................... G02C 7/04 |

FOREIGN PATENT DOCUMENTS

| | | |
|---|---|---|
| CN | 103167390 A | 6/2013 |
| CN | 206650830 U | 11/2017 |
| CN | 107995550 A | 5/2018 |
| CN | 210183483 U | 3/2020 |
| TW | 201908820 A | 3/2019 |

* cited by examiner

*Primary Examiner* — Kile O Blair
(74) *Attorney, Agent, or Firm* — Winston Hsu (57) ABSTRACT

A portable electronic assembly and an adherable earphone structure thereof are provided. The adherable earphone structure includes a carrier substrate, an audio signal receiver, an audio signal processor, an audio signal player, a protective layer, and an adhesive layer. The audio signal receiver is configured for receiving an audio signal provided by a portable electronic device. The audio signal processor and the audio signal player are disposed on the carrier substrate and electrically connected to the audio signal processor. The protective layer is configured for covering the audio signal receiver, the audio signal processor and the audio signal player. The adhesive layer is disposed on the carrier substrate or the protective layer. When the adhesive layer is disposed on a face and near an ear of a user, the adherable earphone structure is disposed outside the ear of the user without touching the ear by the adhesive layer.

16 Claims, 10 Drawing Sheets

PORTABLE ELECTRONIC ASSEMBLY AND AN ADHERABLE EARPHONE STRUCTURE THEREOF

CROSS-REFERENCE TO RELATED PATENT APPLICATION

This application claims the benefit of priority to Taiwan Patent Application No. 109125354, filed on Jul. 28, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic assembly and an earphone structure thereof, and more particularly to a portable electronic assembly and an adherable earphone structure thereof.

BACKGROUND OF THE DISCLOSURE

In the related art, a conventional wireless earphone can be worn by a user to listen to sounds generated from an electronic device, but the conventional wireless earphone still has room for improvement.

SUMMARY OF THE DISCLOSURE

In response to the above-referenced technical inadequacy, the present disclosure provides a portable electronic assembly and an adherable earphone structure thereof.

In one aspect, the present disclosure provides an adherable earphone structure, which includes a carrier substrate, an audio signal receiver, an audio signal processor, an audio signal player, a protective layer, and an adhesive layer. The carrier substrate has a first surface, and a second surface opposite to the first surface. The audio signal receiver is disposed on the first surface of the carrier substrate for wirelessly receiving an audio signal provided by a portable electronic device. The audio signal processor is disposed on the first surface of the carrier substrate and electrically connected to the audio signal receiver. The audio signal player is disposed on the first surface of the carrier substrate and electrically connected to the audio signal processor. The protective layer is disposed on the first surface of the carrier substrate for covering the audio signal receiver, the audio signal processor and the audio signal player. The adhesive layer is disposed on the second surface of the carrier substrate or an outer surface of the protective layer. The audio signal that is wirelessly received by the audio signal receiver is transmitted to the audio signal player through the audio signal processor.

In another aspect, the present disclosure provides an adherable earphone structure, which includes a carrier substrate, an audio signal receiver, an audio signal processor, an audio signal player, a protective layer, and an adhesive layer. The audio signal receiver is disposed on the carrier substrate for wirelessly receiving an audio signal provided by a portable electronic device. The audio signal processor is disposed on the carrier substrate and electrically connected to the audio signal receiver. The audio signal player is disposed on the carrier substrate and electrically connected to the audio signal processor. The protective layer is disposed on the carrier substrate for covering the audio signal receiver, the audio signal processor and the audio signal player. The adhesive layer is disposed on the carrier substrate or the protective layer. When the adhesive layer is disposed on a face and near an ear of a user, the adherable earphone structure is disposed out of the ear of the user without touching the ear by the adhesive layer.

In yet another aspect, the present disclosure provides a portable electronic assembly, which includes a portable electronic device and an adherable earphone structure. The portable electronic device is configured for providing an audio signal. The adherable earphone structure includes a carrier substrate, an audio signal receiver, an audio signal processor, an audio signal player, a protective layer, and an adhesive layer. The audio signal receiver is disposed on the carrier substrate for wirelessly receiving the audio signal that is provided by the portable electronic device. The audio signal processor is disposed on the carrier substrate and electrically connected to the audio signal receiver. The audio signal player is disposed on the carrier substrate and electrically connected to the audio signal processor. The protective layer is disposed on the carrier substrate for covering the audio signal receiver, the audio signal processor and the audio signal player. The adhesive layer is disposed on the carrier substrate or the protective layer. The audio signal that is wirelessly received by the audio signal receiver is transmitted to the audio signal player through the audio signal processor.

Therefore, in the portable electronic assembly and the adherable earphone structure thereof that are provided by the present disclosure, by virtue of "the audio signal receiver being disposed on the carrier substrate for wirelessly receiving an audio signal provided by a portable electronic device", "the audio signal processor being disposed on the carrier substrate and electrically connected to the audio signal receiver", "the audio signal player being disposed on the carrier substrate and electrically connected to the audio signal processor", "the protective layer being disposed on the carrier substrate for covering the audio signal receiver, the audio signal processor and the audio signal player" and "the adhesive layer being disposed on the carrier substrate or the protective layer", the adherable earphone structure can be disposed out of the ear of the user without touching the ear by the adhesive layer, and the audio signal that is wirelessly received by the audio signal receiver can be transmitted to the audio signal player through the audio signal processor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 8, the present disclosure provides an adherable earphone structure E (such as a stickable wireless earphone), which includes a carrier substrate 1, an audio signal receiver 2, an audio signal processor 3, an audio signal player 4, a protective layer 5, and an adhesive layer 6. The audio signal receiver 2 is disposed on the carrier substrate 1 for wirelessly receiving an audio signal S1 (or a sound signal) provided by a portable electronic device P. The audio signal processor 3 is disposed on the carrier substrate 1 and electrically connected to the audio signal receiver 2. The audio signal player 4 is disposed on the carrier substrate 1 and electrically connected to the audio signal processor 3. The protective layer 5 is disposed on the carrier substrate 1 for covering (or completely enclosing) the audio signal receiver 2, the audio signal processor 3 and the audio signal player 4. The adhesive layer 6 is disposed on the carrier substrate 1 or the protective layer 5. Therefore, when the adhesive layer 6 is disposed on (or attached to, or adhered to) a face and near an ear of a user, the adherable earphone structure E can be disposed out of the ear of the user without touching the ear by the adhesive layer 6.

Referring to FIG. 1 to FIG. 8, the present disclosure provides a portable electronic assembly Z, which includes a portable electronic device P for providing an audio signal S1, and an adherable earphone structure E, and the adherable earphone structure E includes a carrier substrate 1, an audio signal receiver 2, an audio signal processor 3, an audio signal player 4, a protective layer 5, and an adhesive layer 6. The audio signal receiver 2 is disposed on the carrier substrate 1 for wirelessly receiving the audio signal S1 that is provided by the portable electronic device P. The audio signal processor 3 is disposed on the carrier substrate 1 and electrically connected to the audio signal receiver 2. The audio signal player 4 is disposed on the carrier substrate 1 and electrically connected to the audio signal processor 3. The protective layer 5 is disposed on the carrier substrate 1 for covering the audio signal receiver 2, the audio signal processor 3 and the audio signal player 4. The adhesive layer 6 is disposed on the carrier substrate 1 or the protective layer 5. Therefore, the audio signal S1 that is wirelessly received by the audio signal receiver 2 can be transmitted to the audio signal player 4 through the audio signal processor 3.

First Embodiment

Figure 1:
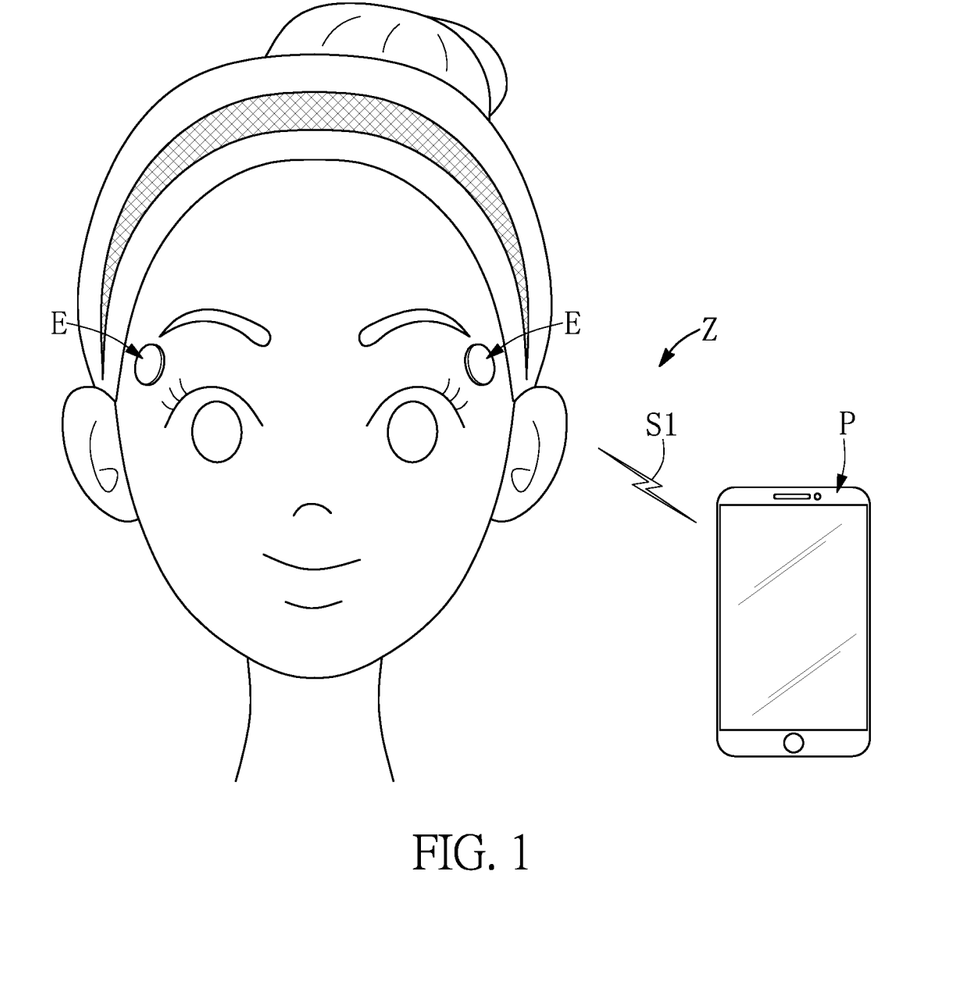
FIG. 1 is a schematic view of a portable electronic assembly according to a first, a second, a third and a fourth embodiment of the present disclosure.
Figure 2:
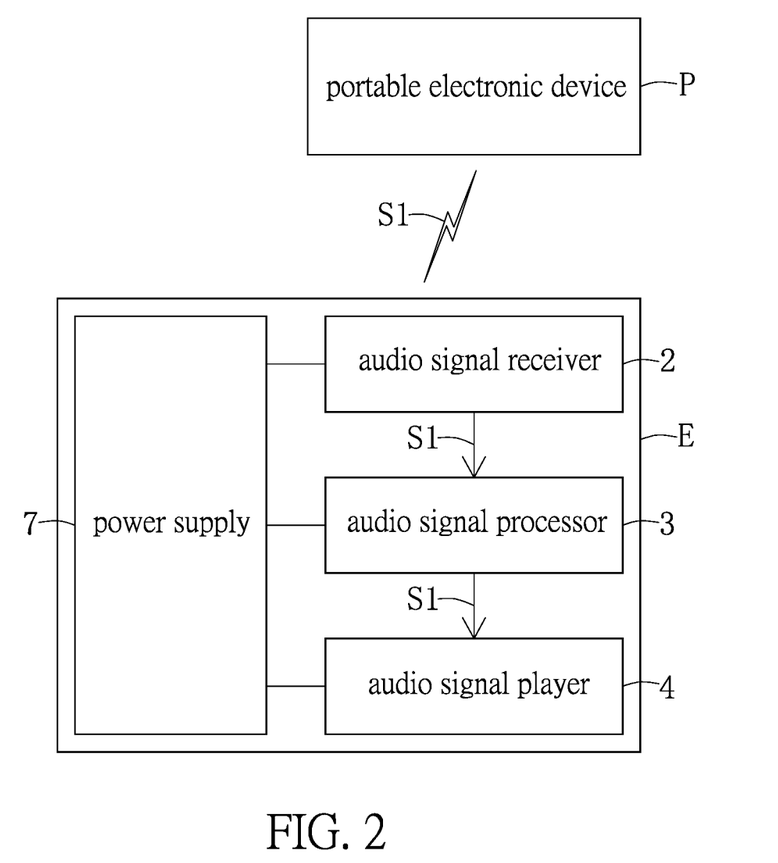
FIG. 2 is a functional block diagram of the portable electronic assembly according to the first, the second, the third and the fourth embodiment of the present disclosure.
Figure 3:
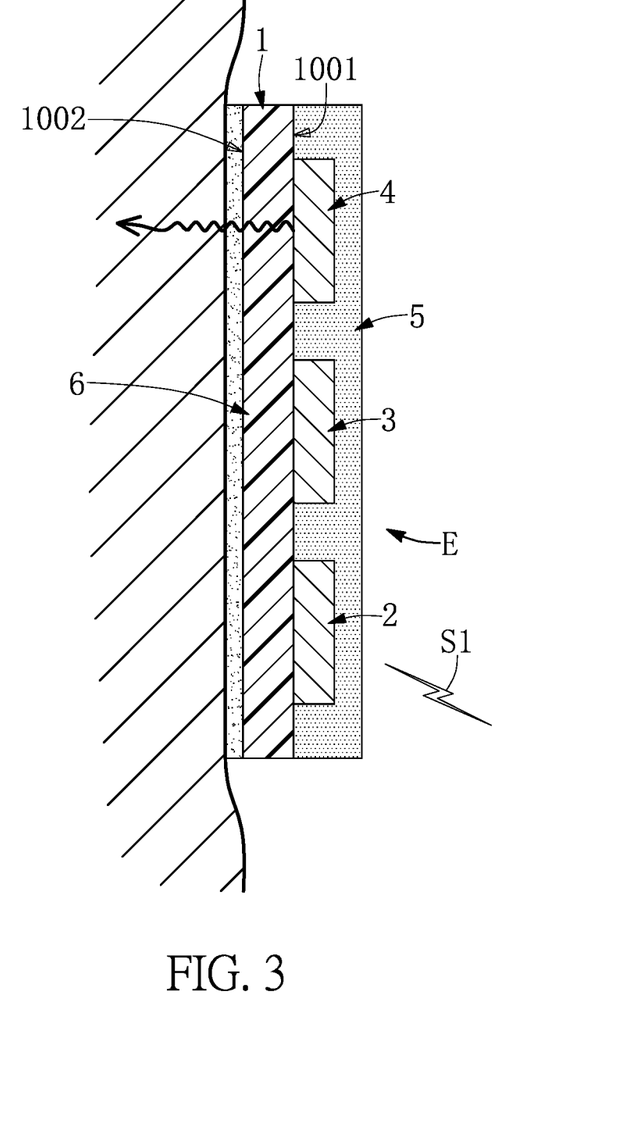
FIG. 3 is a schematic cross-sectional view of an adherable earphone structure adhered to a face a user according to the first embodiment of the present disclosure.

Referring to FIG. 1 to FIG. 3, a first embodiment of the present disclosure provides a portable electronic assembly Z and an adherable earphone structure E thereof. The portable electronic assembly Z includes a portable electronic device P for providing an audio signal S1, and at least one adherable earphone structure E (such as showing two adherable earphone structures E in FIG. 1), and the adherable earphone structure E includes a carrier substrate 1, an audio signal receiver 2, an audio signal processor 3, an audio signal player 4, a protective layer 5, and an adhesive layer 6.

For example, referring to FIG. 2 and FIG. 3, the carrier substrate 1 has a first surface 1001, and a second surface 1002 opposite to the first surface 1001. The audio signal receiver 2 is disposed on the first surface 1001 of the carrier substrate 1 for wirelessly receiving the audio signal S1 that is provided by the portable electronic device P, and the audio signal receiver 2 can be a Bluetooth® receiver or any wireless receiver for short range communication. In addition, the audio signal processor 3 is disposed on the first surface 1001 of the carrier substrate 1 and electrically connected to the audio signal receiver 2, and the audio signal processor 3 can be a central processing unit (CPU), a digital signal processor (DSP), a microprocessor unit (MPU), or a main controller unit (MCU). Moreover, the audio signal player 4 is disposed on the first surface 1001 of the carrier substrate 1 and electrically connected to the audio signal processor 3, and the audio signal player 4 can be a MEMS (microelectromechanical systems) speaker, a semiconductor speaker, or any other kind of micro speaker. Furthermore, the protective layer 5 is disposed on the first surface 1001 of the carrier substrate 1 for covering the audio signal receiver 2, the audio signal processor 3 and the audio signal player 4, and the protective layer 5 can be any kind of insulative material such as epoxy or silicone. In addition, the adhesive layer 6 is disposed on the second surface 1002 of the carrier substrate 1, and the adhesive layer 6 can be made of any kind of adhesive material that can be repeatably attached to the skin of the user. However, the aforementioned description is merely an example, and is not meant to limit the scope of the present disclosure.

It should be noted that, for example, referring to FIG. 1 and FIG. 2, the adhesive layer 6 can be disposed on a face and near an ear of a user, so that the adherable earphone structure E can be disposed out of the ear of the user by the adhesive layer 6, and the adherable earphone structure E cannot contact the ear. Therefore, after the audio signal S1 that is provided by the portable electronic device P is wirelessly received by the audio signal receiver 2, the audio signal S1 that is wirelessly received by the audio signal receiver 2 can be transmitted to the audio signal player 4 through the audio signal processor 3, and the audio signal S1 can be converted into a vibration signal through the audio signal player 4. Finally, the vibration signal can be transmitted to the user through a facial bone of the user so as to allow a user to listen to the sound of the audio signal S1, so that the adherable earphone structure E can serve as a bone conduction loudspeaker. However, the aforementioned description is merely an example, and is not meant to limit the scope of the present disclosure.

It should be noted that, for example, referring to FIG. 1 and FIG. 3, a sound-insulating capability (or a soundproof capability) of the carrier substrate 1 is significantly smaller than a sound-insulating capability of the protective layer 5, so that it is much easier for the audio signal S1 to pass through the carrier substrate 1 than the protective layer 5, and it is much easier for the protective layer 5 to block or reflect the audio signal S1 than the carrier substrate 1. Hence, on the one hand, the audio signal S1 can easily pass through the carrier substrate 1, and on the other hand, the audio signal S1 can be easily reflected by the protective layer 5 and cannot easily pass through the protective layer 5. However, the aforementioned description is merely an example, and is not meant to limit the scope of the present disclosure.

It should be noted that as shown in FIG. 2, the adherable earphone structure E of the present disclosure further includes a power supply 7. The power supply 7 is disposed on the first surface 1001 of the carrier substrate 1 for providing a power source, and the power supply 7 is electrically connected to the audio signal receiver 2, the audio signal processor 3 and the audio signal player 4. For example, the power supply 7 can be a battery module that can put electricity into the adherable earphone structure E. However, the aforementioned description is merely an example, and is not meant to limit the scope of the present disclosure.

Second Embodiment

Figure 4:
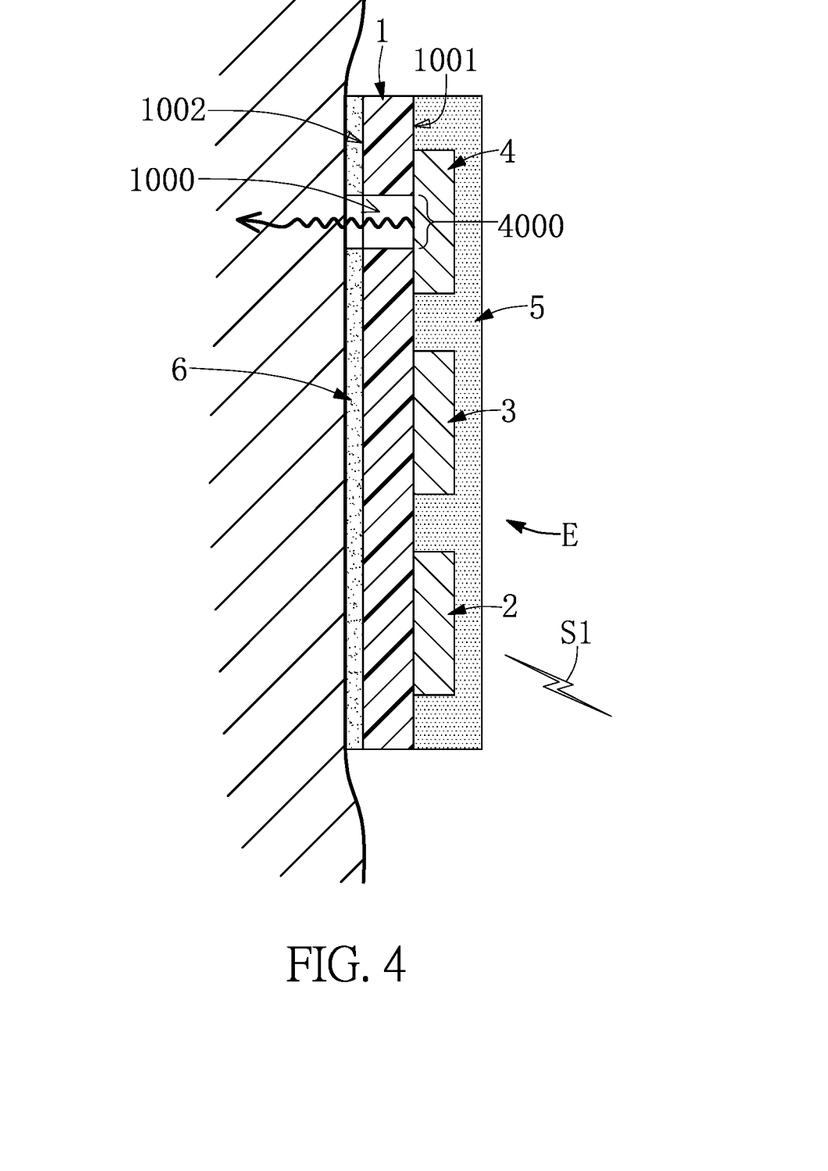
FIG. 4 is a schematic cross-sectional view of an adherable earphone structure adhered to a face a user according to the second embodiment of the present disclosure.

Referring to FIG. 1, FIG. 2 and FIG. 4, a second embodiment of the present disclosure provides a portable electronic assembly Z and an adherable earphone structure E thereof. Comparing FIG. 4 with FIG. 3, the biggest difference between the second embodiment and the first embodiment is as follows: in the second embodiment, the audio signal player 4 has an audio broadcasting region 4000 (or an audio playing region), and the carrier substrate 1 has a sound guiding hole 1000 (or an audio guiding hole) for exposing the audio broadcasting region 4000. Therefore, the audio signal S1 that is transmitted from the audio signal processor 3 to the audio signal player 4 can be transmitted to a user through the sound guiding hole 1000 of the carrier substrate 1. That is to say, the air inside the sound guiding hole 1000 can serve as a communication media for transmitting the audio signal S1, so that a communication effect of the audio signal S1 that is transmitted from the adherable earphone structure E to the user can be increased.

Third Embodiment

Figure 5:
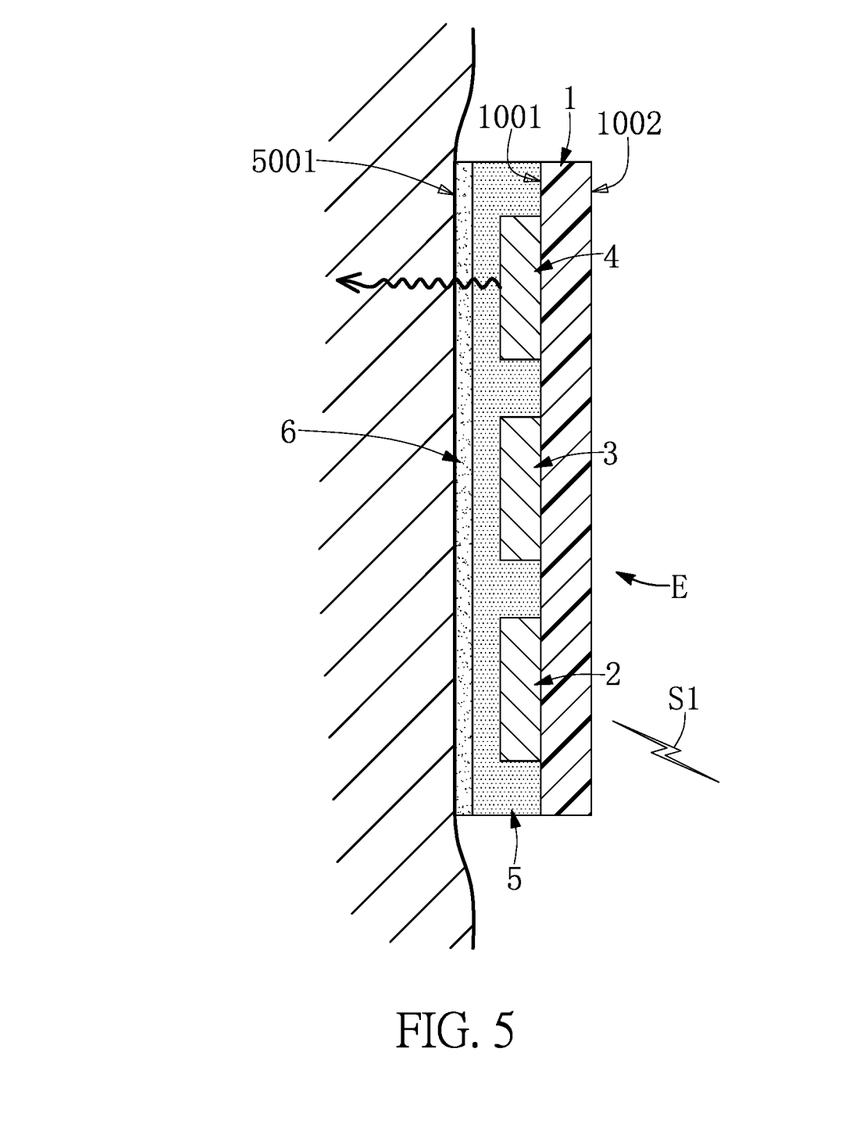
FIG. 5 is a schematic cross-sectional view of an adherable earphone structure adhered to a face a user according to the third embodiment of the present disclosure.

Referring to FIG. 1, FIG. 2 and FIG. 5, a third embodiment of the present disclosure provides a portable electronic assembly Z and an adherable earphone structure E thereof. Comparing FIG. 5 with FIG. 3, the biggest difference between the third embodiment and the first embodiment is as follows: in the third embodiment, the adhesive layer 6 is disposed on an outer surface 5001 of the protective layer 5. For example, a sound-insulating capability (or a soundproof capability) of the carrier substrate 1 is significantly larger than a sound-insulating capability of the protective layer 5, so that it is much easier for the audio signal S1 to pass through the protective layer 5 than the carrier substrate 1, and it is much easier for the carrier substrate 1 to block or reflect the audio signal S1 than the protective layer 5. Hence, on the one hand, the audio signal S1 can easily pass through the protective layer 5, and on the other hand, the audio signal S1 can be easily reflected by the carrier substrate 1 and cannot easily pass through the carrier substrate 1. However, the aforementioned description is merely an example, and is not meant to limit the scope of the present disclosure.

Fourth Embodiment

Figure 6:
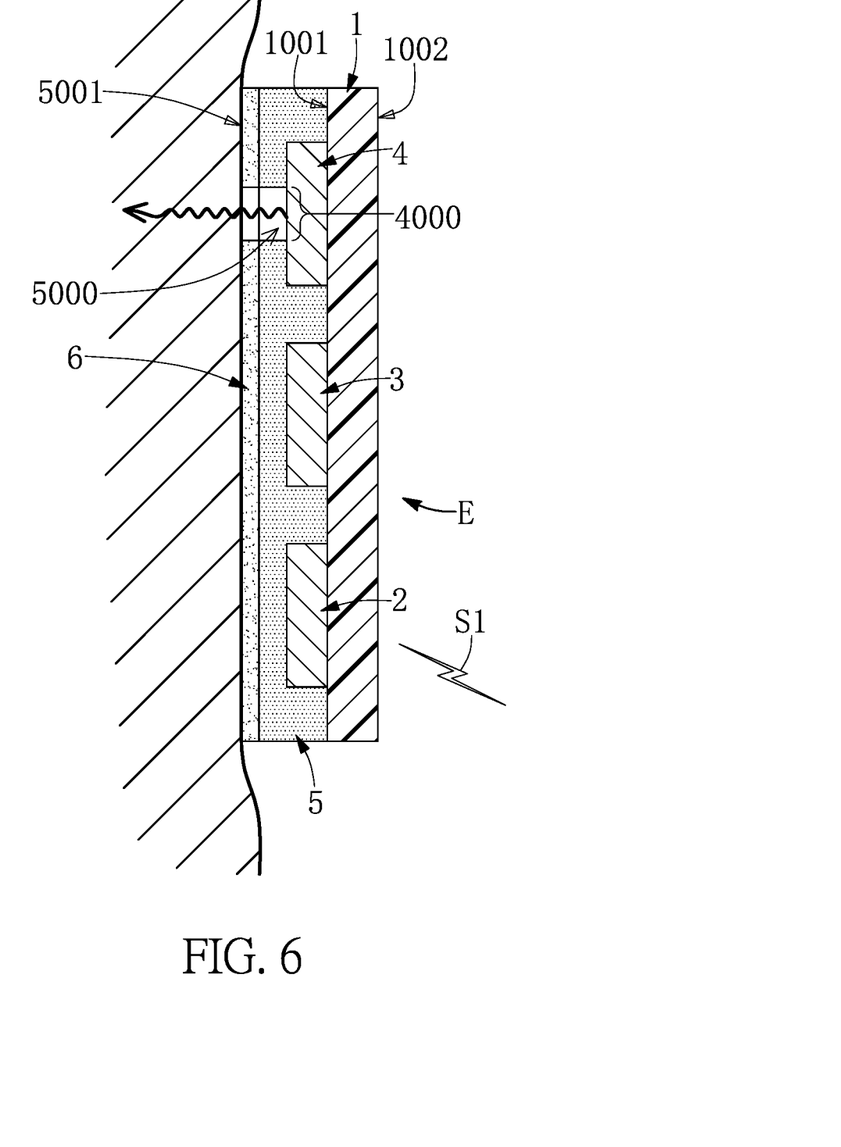
FIG. 6 is a schematic cross-sectional view of an adherable earphone structure adhered to a face a user according to the fourth embodiment of the present disclosure.

Referring to FIG. 1, FIG. 2 and FIG. 6, a fourth embodiment of the present disclosure provides a portable electronic assembly Z and an adherable earphone structure E thereof. Comparing FIG. 6 with FIG. 5, the biggest difference between the fourth embodiment and the third embodiment is as follows: in the fourth embodiment, the audio signal player 4 has an audio broadcasting region 4000, and the protective layer 5 has a sound guiding hole 5000 for exposing the audio broadcasting region 4000. Therefore, the audio signal S1 that is transmitted from the audio signal processor 3 to the audio signal player 4 can be transmitted to a user through the sound guiding hole 5000 of the protective layer 5. That is to say, the air inside the sound guiding hole 5000 can serve as a communication media for transmitting the audio signal S1, so that a communication effect of the audio signal S1 that is transmitted from the adherable earphone structure E to the user can be increased.

Fifth Embodiment

Figure 7:
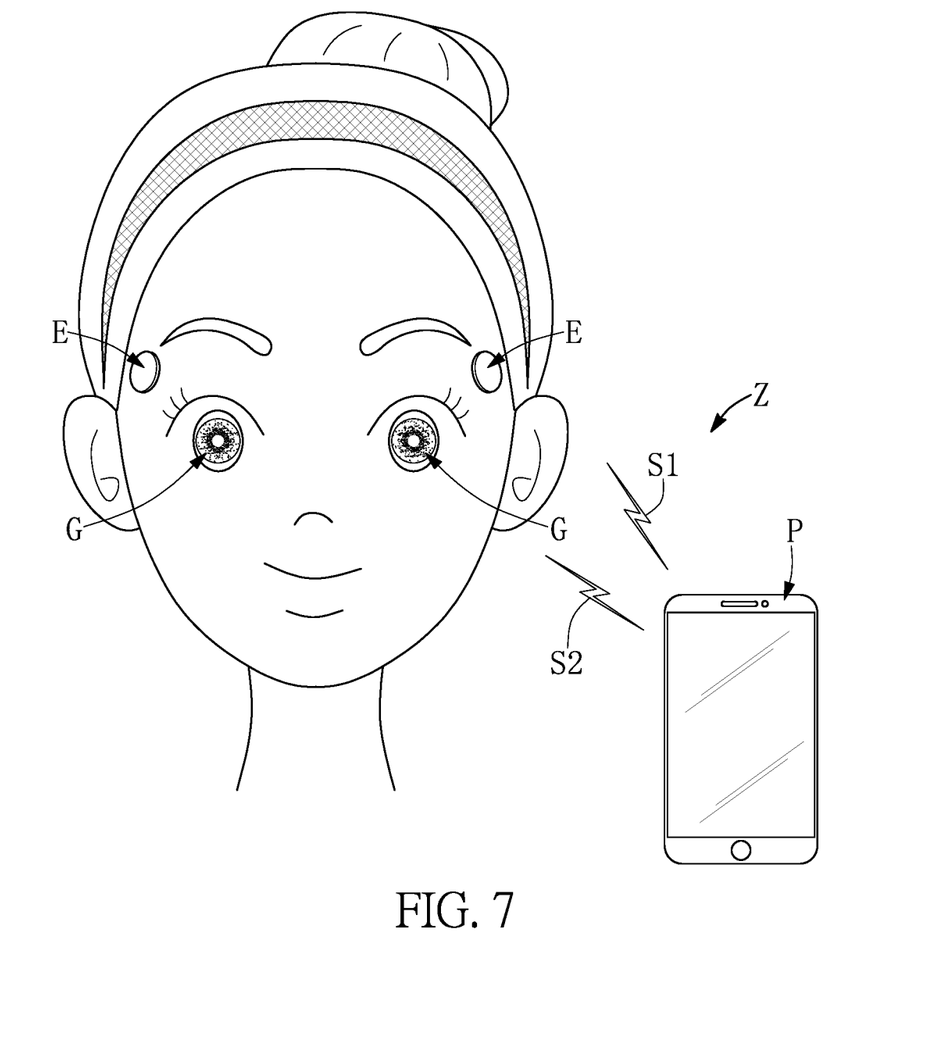
FIG. 7 is a schematic view of a portable electronic assembly according to a fifth embodiment of the present disclosure.
Figure 8:
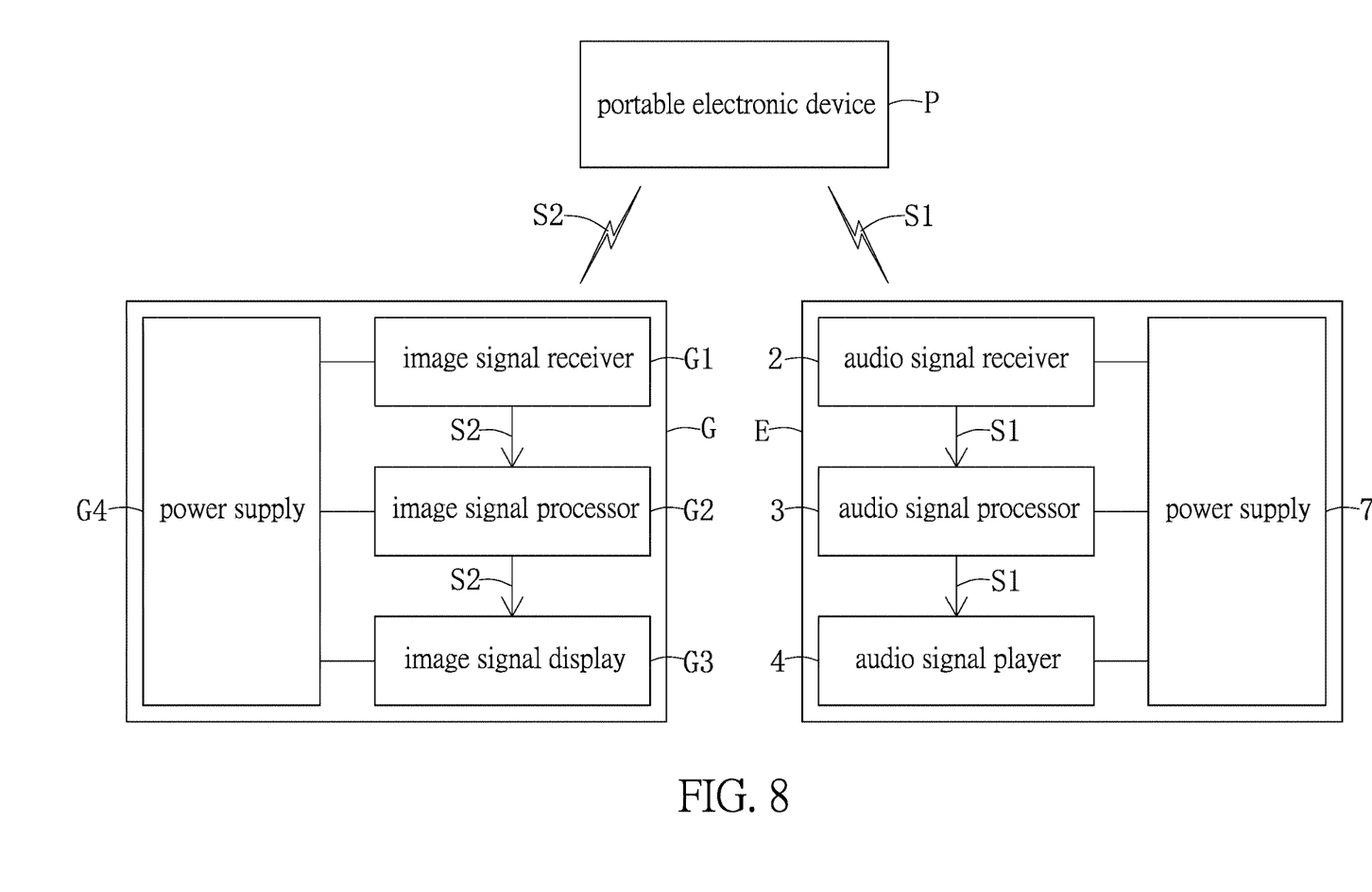
FIG. 8 is a functional block diagram of the portable electronic assembly according to the fifth embodiment of the present disclosure.

Referring to FIG. 7 and FIG. 8, a fifth embodiment of the present disclosure provides a portable electronic assembly Z and an adherable earphone structure E thereof. Comparing FIG. 7 with FIG. 1, and comparing FIG. 8 with FIG. 2, the biggest difference between the fifth embodiment and the first embodiment is as follows: in the fifth embodiment, a portable electronic device P can be configured to wirelessly transmit an image signal S1 to an image signal display G3 (such as showing two image signal displays G3 in FIG. 7) of a contact lens G that is worn by the user, and the image signal S2 and the audio signal S1 can match with each other (or the image signal S2 and the audio signal S1 can cooperate with each other or correspond to each other to form an audio video signal).

It should be noted that as shown in FIG. 8, the contact lens G includes an image signal receiver G1 for wirelessly receiving the image signal S2, and an image signal processor G2 is electrically connected between the image signal receiver G1 and the image signal display G3. In addition, the image signal S2 that is wirelessly received by the image signal receiver G1 can be transmitted to the image signal display G3 through the image signal processor G2. For example, the portable electronic device P can be one of a smartphone, a tablet computer and a stethoscope. Moreover, the image signal receiver G1 can be a Bluetooth® receiver or any wireless receiver for short range communication, the image signal processor G2 can be a central processing unit (CPU), a digital signal processor (DSP), a microprocessor unit (MPU), or a main controller unit (MCU), and the image signal display G3 can be a light-emitting diode (LED) display or an organic light-emitting diode (OLED) display. However, the aforementioned description is merely an example, and is not meant to limit the scope of the present disclosure.

It should be noted that as shown in FIG. 8, the contact lens G further includes a power supply G4 that is electrically connected to the image signal receiver G1, the image signal processor G2, and the image signal display G3. For example, the power supply G4 can be a battery module that can put electricity into the contact lens G. However, the aforementioned description is merely an example, and is not meant to limit the scope of the present disclosure.

Sixth Embodiment

Figure 9:
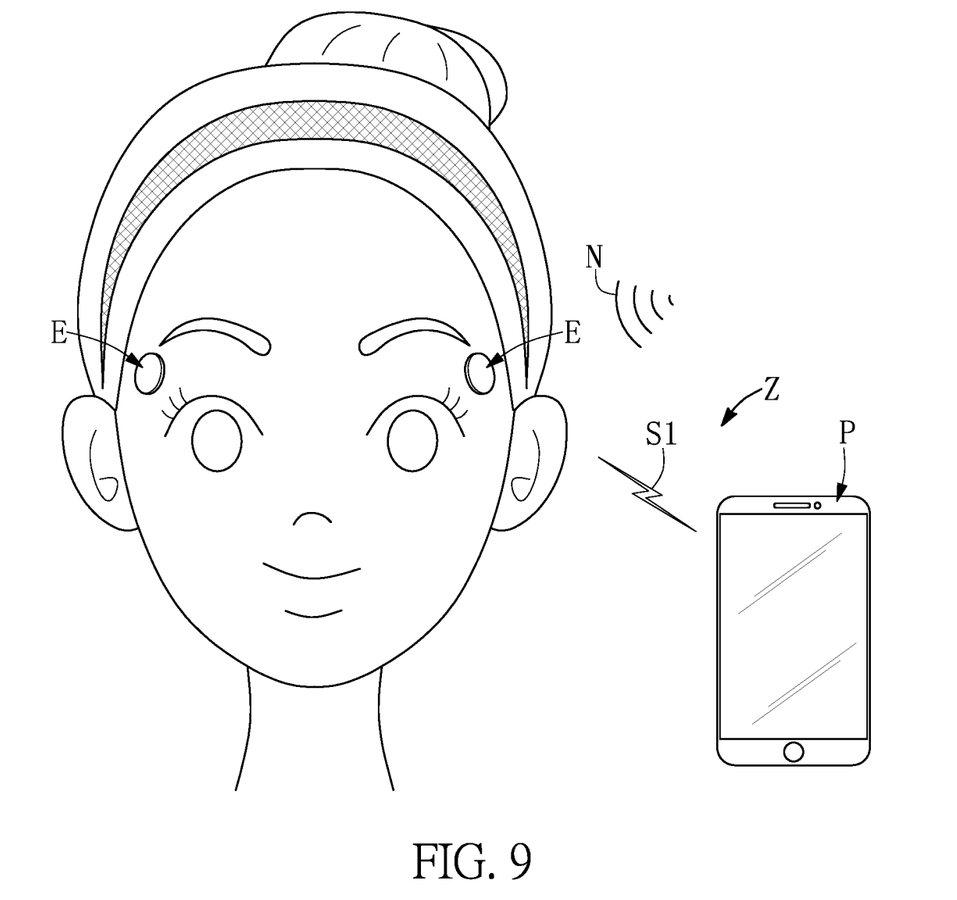
FIG. 9 is a schematic view of a portable electronic assembly according to a sixth embodiment of the present disclosure.
Figure 10:
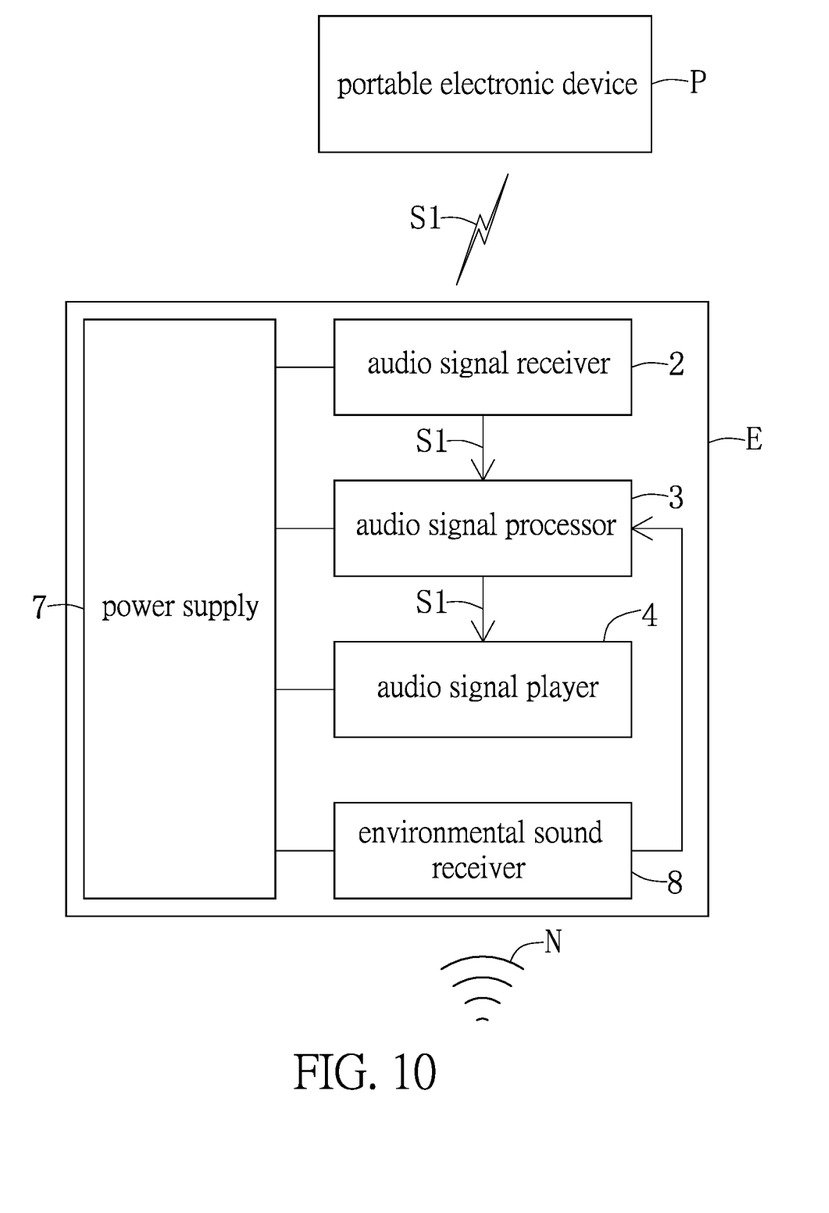
FIG. 10 is a functional block diagram of the portable electronic assembly according to the sixth embodiment of the present disclosure.

Referring to FIG. 9 and FIG. 10, a sixth embodiment of the present disclosure provides a portable electronic assembly Z and an adherable earphone structure E thereof. Comparing FIG. 9 with FIG. 1, and comparing FIG. 10 with FIG. 2, the biggest difference between the sixth embodiment and the first embodiment is as follows: in the sixth embodiment, the adherable earphone structure E further includes an environmental sound receiver 8. More particularly, the environmental sound receiver 8 is disposed on the first surface 1001 of the carrier substrate 1 for receiving an environmental sound N generated by an ambient region around the adherable earphone structure E, and the environmental sound receiver 8 is electrically connected to the audio signal processor 3 and the power supply 7. Therefore, when the environmental sound N has a regular noise (or an irregular noise), the audio signal processor 3 can be configured to generate a sonic wave to cancel (or offset) the regular noise, in which the sonic wave has a phase opposite to a phase of the regular noise (or the irregular noise), and an amplitude the same as an amplitude of the regular noise (or the irregular noise).

Beneficial Effects of the Embodiments

In conclusion, in the portable electronic assembly Z and the adherable earphone structure E thereof that are provided by the present disclosure, by virtue of "the audio signal receiver 2 being disposed on the carrier substrate 1 for wirelessly receiving an audio signal S1 provided by a portable electronic device P", "the audio signal processor 3 being disposed on the carrier substrate 1 and electrically connected to the audio signal receiver 2", "the audio signal player 4 being disposed on the carrier substrate 1 and electrically connected to the audio signal processor 3", "the protective layer 5 being disposed on the carrier substrate 1 for covering the audio signal receiver 2, the audio signal processor 3 and the audio signal player 4" and "the adhesive layer 6 being disposed on the carrier substrate 1 or the protective layer 5", the adherable earphone structure E can be disposed out of the ear of the user without touching the ear by the adhesive layer 6, and the audio signal S1 that is wirelessly received by the audio signal receiver 2 can be transmitted to the audio signal player 4 through the audio signal processor 3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adherable earphone structure, comprising:
   a carrier substrate having a first surface, and a second surface opposite to the first surface;
   an audio signal receiver disposed on the first surface of the carrier substrate for wirelessly receiving an audio signal provided by a portable electronic device;
   an audio signal processor disposed on the first surface of the carrier substrate and electrically connected to the audio signal receiver;
   an audio signal player disposed on the first surface of the carrier substrate and electrically connected to the audio signal processor, the audio signal player having an audio broadcasting region;
   a protective layer disposed on the first surface of the carrier substrate for covering the audio signal receiver, the audio signal processor and the audio signal player, the protective layer having a sound guiding hole for exposing the audio broadcasting region; and
   an adhesive layer disposed on the second surface of the carrier substrate or an outer surface of the protective layer;
   wherein the audio signal that is wirelessly received by the audio signal receiver is transmitted to the audio signal player through the audio signal processor, and the audio signal transmitted from the audio signal processor to the audio signal player is transmitted to a user through the sound guiding hole of the protective layer.

2. The adherable earphone structure according to claim 1, wherein, when the adhesive layer is disposed on a face and near an ear of the user, the adherable earphone structure is disposed out of the ear of the user without touching the ear by the adhesive layer.

3. The adherable earphone structure according to claim 1, wherein a sound-insulating capability of the carrier substrate is significantly larger than a sound-insulating capability of the protective layer, so that it is much easier for the audio signal to pass through the protective layer than the carrier substrate, and it is much easier for the carrier substrate to block or reflect the audio signal than the protective layer.

4. The adherable earphone structure according to claim 1, further comprising:
an environmental sound receiver disposed on the first surface of the carrier substrate for receiving an environmental sound generated by an ambient region around the adherable earphone structure; and
a power supply disposed on the first surface of the carrier substrate for providing a power source.

5. The adherable earphone structure according to claim 4, wherein the environmental sound receiver is electrically connected to the audio signal processor, and the power supply is electrically connected to the audio signal receiver, the audio signal processor, the audio signal player, and the environmental sound receiver;
wherein, when the environmental sound has a regular noise, the audio signal processor is configured to generate a sonic wave that has a phase opposite to a phase of the regular noise, and an amplitude the same as an amplitude of the regular noise, so as to cancel the regular noise.

6. The adherable earphone structure according to claim 1, wherein the portable electronic device is configured to wirelessly transmit an image signal to an image signal display of a contact lens that is worn by the user, and the image signal and the audio signal match with each other;
wherein the contact lens includes an image signal receiver for wirelessly receiving the image signal, and an image signal processor electrically connected between the image signal receiver and the image signal display, and the image signal that is wirelessly received by the image signal receiver is transmitted to the image signal display through the image signal processor;
wherein the portable electronic device is one of a smartphone, a tablet computer and a stethoscope.

7. An adherable earphone structure, comprising:
a carrier substrate;
an audio signal receiver disposed on the carrier substrate for wirelessly receiving an audio signal provided by a portable electronic device;
an audio signal processor disposed on the carrier substrate and electrically connected to the audio signal receiver;
an audio signal player disposed on the carrier substrate and electrically connected to the audio signal processor, the audio signal player having an audio broadcasting region;
a protective layer disposed on the carrier substrate for covering the audio signal receiver, the audio signal processor and the audio signal player, the protective layer having a sound guiding hole for exposing the audio broadcasting region; and
an adhesive layer disposed on the carrier substrate or the protective layer;
wherein, when the adhesive layer is disposed on a face and near an ear of a user, the adherable earphone structure is disposed out of the ear of the user without touching the ear by the adhesive layer, and the audio signal transmitted from the audio signal processor to the audio signal player is transmitted to the user through the sound guiding hole of the protective layer.

8. The adherable earphone structure according to claim 7, wherein a sound-insulating capability of the carrier substrate is significantly larger than a sound-insulating capability of the protective layer, so that it is much easier for the audio signal to pass through the protective layer than the carrier substrate, and it is much easier for the carrier substrate to block or reflect the audio signal than the protective layer.

9. The adherable earphone structure according to claim 7, further comprising:
an environmental sound receiver disposed on the carrier substrate for receiving an environmental sound generated by an ambient region around the adherable earphone structure; and
a power supply disposed on the carrier substrate for providing a power source.

10. The adherable earphone structure according to claim 9, wherein the environmental sound receiver is electrically connected to the audio signal processor, and the power supply is electrically connected to the audio signal receiver, the audio signal processor, the audio signal player, and the environmental sound receiver;
wherein, when the environmental sound has a regular noise, the audio signal processor is configured to generate a sonic wave that has a phase opposite to a phase of the regular noise, and an amplitude the same as an amplitude of the regular noise, so as to cancel the regular noise.

11. The adherable earphone structure according to claim 7, wherein the portable electronic device is configured to wirelessly transmit an image signal to an image signal display of a contact lens that is worn by the user, and the image signal and the audio signal match with each other;
wherein the contact lens includes an image signal receiver for wirelessly receiving the image signal, and an image signal processor electrically connected between the image signal receiver and the image signal display, and the image signal that is wirelessly received by the image signal receiver is transmitted to the image signal display through the image signal processor;
wherein the portable electronic device is one of a smartphone, a tablet computer and a stethoscope.

12. A portable electronic assembly, comprising:
a portable electronic device configured for providing an audio signal; and
an adherable earphone structure including a carrier substrate, an audio signal receiver, an audio signal processor, an audio signal player, a protective layer, and an adhesive layer;
wherein the audio signal receiver is disposed on the carrier substrate for wirelessly receiving the audio signal that is provided by the portable electronic device;
wherein the audio signal processor is disposed on the carrier substrate and electrically connected to the audio signal receiver;
wherein the audio signal player is disposed on the carrier substrate and electrically connected to the audio signal processor, and the audio signal player has an audio broadcasting region;
wherein the protective layer is disposed on the carrier substrate for covering the audio signal receiver, the audio signal processor and the audio signal player, and the protective layer has a sound guiding hole for exposing the audio broadcasting region;
wherein the adhesive layer is disposed on the carrier substrate or the protective layer;
wherein the audio signal that is wirelessly received by the audio signal receiver is transmitted to the audio signal player through the audio signal processor, and the audio signal transmitted from the audio signal processor to the audio signal player is transmitted to a user through the sound guiding hole of the protective layer.

13. The adherable earphone structure according to claim 12,
wherein a sound-insulating capability of the carrier substrate is significantly larger than a sound-insulating capability of the protective layer, so that it is much easier for the audio signal to pass through the protective layer than the carrier substrate, and it is much easier for the carrier substrate to block or reflect the audio signal than the protective layer;
wherein the portable electronic device is configured to wirelessly transmit an image signal to an image signal display of a contact lens that is worn by the user, and the image signal and the audio signal match with each other; wherein the contact lens includes an image signal receiver for wirelessly receiving the image signal, and an image signal processor electrically connected between the image signal receiver and the image signal display, and the image signal that is wirelessly received by the image signal receiver is transmitted to the image signal display through the image signal processor.

14. An adherable earphone structure, comprising:
a carrier substrate having a first surface, and a second surface opposite to the first surface;
an audio signal receiver disposed on the first surface of the carrier substrate for wirelessly receiving an audio signal provided by a portable electronic device;
an audio signal processor disposed on the first surface of the carrier substrate and electrically connected to the audio signal receiver;
an audio signal player disposed on the first surface of the carrier substrate and electrically connected to the audio signal processor, the audio signal player having an audio broadcasting region, and the carrier substrate having a sound guiding hole for exposing the audio broadcasting region;
a protective layer disposed on the first surface of the carrier substrate for covering the audio signal receiver, the audio signal processor and the audio signal player; and
an adhesive layer disposed on the second surface of the carrier substrate or an outer surface of the protective layer;
wherein the audio signal that is wirelessly received by the audio signal receiver is transmitted to the audio signal player through the audio signal processor, and the audio signal transmitted from the audio signal processor to the audio signal player is transmitted to a user through the sound guiding hole of the carrier substrate.

15. An adherable earphone structure, comprising:
a carrier substrate;
an audio signal receiver disposed on the carrier substrate for wirelessly receiving an audio signal provided by a portable electronic device;
an audio signal processor disposed on the carrier substrate and electrically connected to the audio signal receiver;
an audio signal player disposed on the carrier substrate and electrically connected to the audio signal processor, the audio signal player having an audio broadcasting region, and the carrier substrate having a sound guiding hole for exposing the audio broadcasting region;
a protective layer disposed on the carrier substrate for covering the audio signal receiver, the audio signal processor and the audio signal player; and
an adhesive layer disposed on the carrier substrate or the protective layer;
wherein, when the adhesive layer is disposed on a face and near an ear of a user, the adherable earphone structure is disposed out of the ear of the user without touching the ear by the adhesive layer, and the audio signal transmitted from the audio signal processor to the audio signal player is transmitted to the user through the sound guiding hole of the carrier substrate.

16. A portable electronic assembly, comprising:
a portable electronic device configured for providing an audio signal; and
an adherable earphone structure including a carrier substrate, an audio signal receiver, an audio signal processor, an audio signal player, a protective layer, and an adhesive layer;
wherein the audio signal receiver is disposed on the carrier substrate for wirelessly receiving the audio signal that is provided by the portable electronic device;
wherein the audio signal processor is disposed on the carrier substrate and electrically connected to the audio signal receiver;
wherein the audio signal player is disposed on the carrier substrate and electrically connected to the audio signal processor, the audio signal player has an audio broadcasting region, and the carrier substrate having a sound guiding hole for exposing the audio broadcasting region;
wherein the protective layer is disposed on the carrier substrate for covering the audio signal receiver, the audio signal processor and the audio signal player;
wherein the adhesive layer is disposed on the carrier substrate or the protective layer;
wherein the audio signal that is wirelessly received by the audio signal receiver is transmitted to the audio signal player through the audio signal processor, and the audio signal transmitted from the audio signal processor to the audio signal player is transmitted to a user through the sound guiding hole of the carrier substrate.

* * * * *